(12) United States Patent
Hamamoto

(10) Patent No.: US 8,068,253 B2
(45) Date of Patent: Nov. 29, 2011

(54) RECORDING APPARATUS

(75) Inventor: Akihiko Hamamoto, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1137 days.

(21) Appl. No.: 11/428,905

(22) Filed: Jul. 6, 2006

(65) Prior Publication Data

US 2007/0008555 A1    Jan. 11, 2007

(30) Foreign Application Priority Data

Jul. 8, 2005  (JP) .................................. 2005-199965

(51) Int. Cl.
*G06K 15/10* (2006.01)
*G06K 15/00* (2006.01)
*H04N 1/405* (2006.01)
*B41J 29/38* (2006.01)
*B41J 2/165* (2006.01)
*B41J 2/01* (2006.01)

(52) U.S. Cl. ........... 358/1.8; 358/1.16; 358/3.06; 347/5; 347/23; 347/107

(58) Field of Classification Search ................... 358/1.9; 347/5, 23, 107

See application file for complete search history.

(56) References Cited

U.S. PATENT DOCUMENTS

| | | | |
|---|---|---|---|
| 6,097,499 A | | 8/2000 | Casey et al. |
| 6,779,867 B2 * | | 8/2004 | Shimizu et al. ................. 347/23 |
| 6,843,610 B2 * | | 1/2005 | Ioka et al. ....................... 400/76 |
| 6,896,345 B2 * | | 5/2005 | Nakayama et al. ............... 347/5 |
| 7,150,511 B2 * | | 12/2006 | Oguri et al. ..................... 347/19 |
| 7,159,959 B2 * | | 1/2007 | Schremp ........................... 347/5 |
| 7,213,900 B2 * | | 5/2007 | Ebihara ........................... 347/19 |

FOREIGN PATENT DOCUMENTS

| | | |
|---|---|---|
| JP | 11-259248 A | 9/1999 |
| JP | 2003-305903 A | 10/2003 |
| JP | 2004-102445 A | 4/2004 |

* cited by examiner

*Primary Examiner* — Sudhanshu Pathak
*Assistant Examiner* — Mesfin Getaneh
(74) *Attorney, Agent, or Firm* — Canon U.S.A., Inc. IP Division

(57) ABSTRACT

A recording apparatus having a buffer to store recording data associated with a recording area in a scanning direction of a recording head divided into a plurality of areas. The buffer stores the recording data in units of the divided areas. The recording apparatus includes a signal generation unit configured to output a signal according to a position of the recording head, a transfer data generation unit configured to generate transfer data transferred to the recording head based on the signal output from the signal generation unit, and a pattern data generation unit configured to generate predetermined pattern data. The transfer data generation unit includes a first input section for receiving the recording data read from the buffer and a second input section for receiving the pattern data generated by the pattern data generation unit.

5 Claims, 11 Drawing Sheets

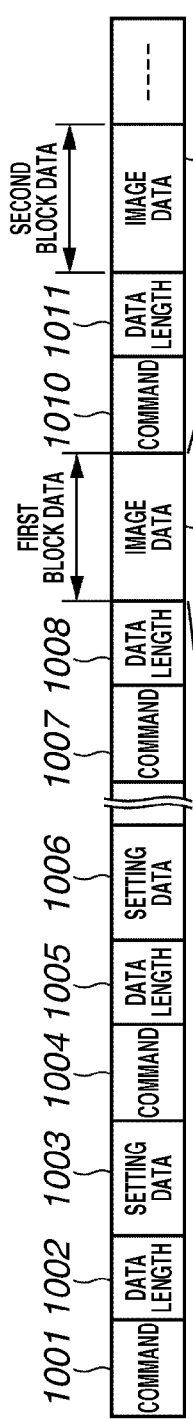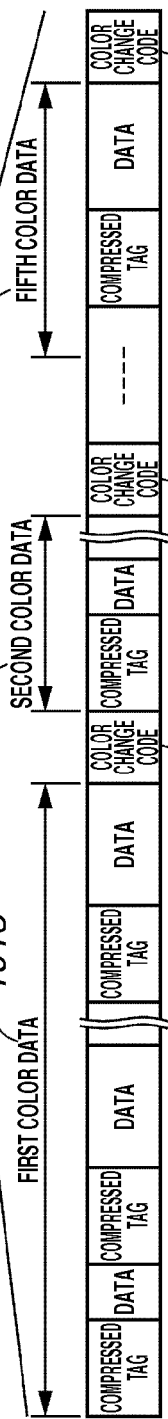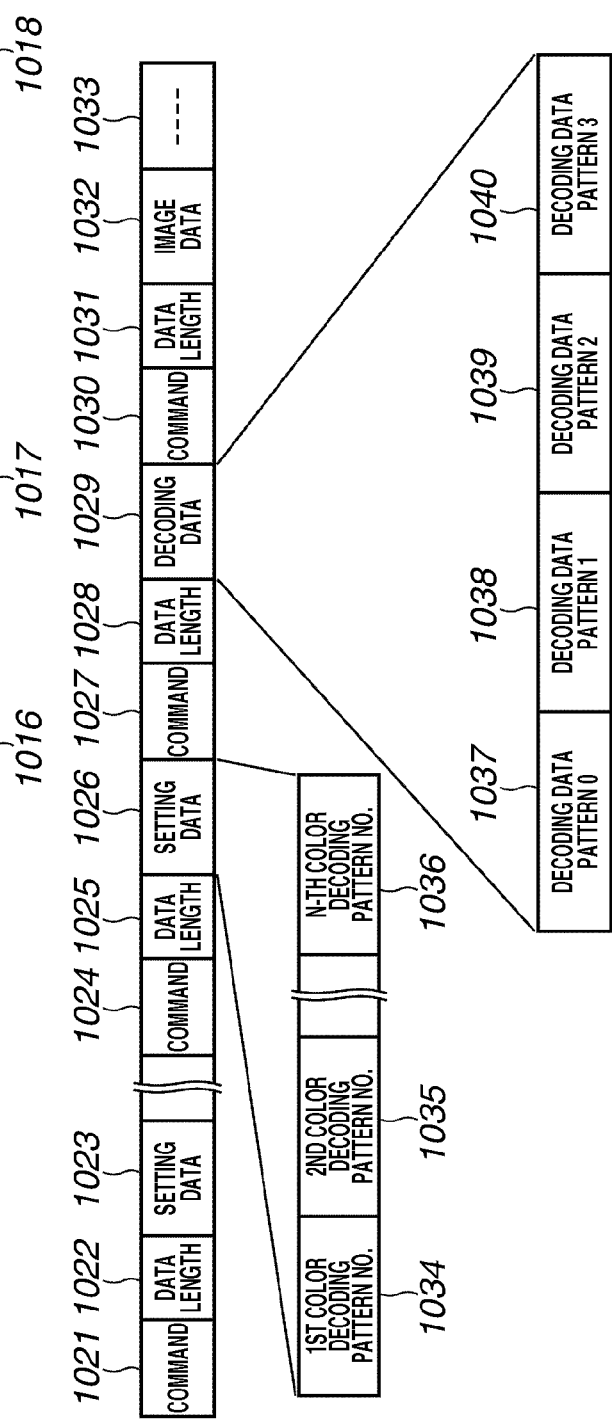

RECORDING APPARATUS

BACKGROUND OF THE INVENTION

1. Field of the Invention

The present invention relates to a recording apparatus, and more particularly to discharge pattern generation.

2. Description of the Related Art

An ink jet recording apparatus of a serial type forms an image by moving a carriage having a recording head mounted thereon in a main scanning direction that is different from a paper feeding direction, and discharging inks from nozzles of the recording head.

Such recording apparatus typically includes a printing buffer (recording buffer) for holding recording data to be transferred to the recording head. As to a memory capacity of the printing buffer, an amount sufficient for holding all data to be recorded in at least one main scanning direction is typically provided (printing buffer of 1 band).

For example, when recording is carried out in an 8-inch width at resolution of 600 dpi in a main scanning direction and a recording head has 128 nozzles arranged at 600 dpi in a subscanning direction, a printing buffer necessary for one main scanning may require a memory capacity of 76800 bytes per color.

In order to realize high quality image, a multidroplet method is available. In the multidroplet method, plural amounts of each color ink are discharged while one kind of a discharge amount is conventionally permitted per color. Alternatively, a multicoloring method is also available which adds photocyan (PC) and photomagenta (PM) to four basic colors of cyan (C), magenta (M), yellow (Y) and black (K) to improve a gray scale of a photo-image. Accordingly, a memory capacity necessary for the recording apparatus tends to increase.

Moreover, in order to realize a high printing speed, attempts have continuously been made to reduce the number of scanning times necessary for printing one page by increasing the number of nozzles of each color. This also tends to increase a memory capacity of the printing buffer.

An increase in printing buffer size leads to a cost increase of a printer. However, in association with an increase in number of host apparatus (host computers) put into a market and a reduction in its price, there has been a trend in price reduction of ink jet recording apparatus in the market. Especially, a price reduction has been conspicuous in a low-end ink jet recording apparatus. To realize the price reduction, a memory size of an ink jet printer is reduced so that the price can be lowered. For example, there is a method that reduces a printing buffer size such that it is smaller than an amount of data associated with one main scanning direction.

For example, there has been a proposal to reduce printing buffer size by controlling main scanning to start before data input of one main scanning amount is completed in a buffer (JP A 11-259248). There has also been a proposal to carry out a recovery control when data transfer from a host apparatus to a recording apparatus is not in time because of an increase in processing load or the like caused by multitask processing of a CPU in the host apparatus (JP A 2003-305903).

An ink jet printer typically incorporates a function of printing a nozzle check pattern to enable a user to check a status of the nozzles arranged in the recording head.

In the case of a printer capable of securing a printing buffer of one band, a process is started when a predetermined command is sent from the host apparatus or nozzle check pattern printing is confirmed by a predetermined key operation. In other words, a paper feeding operation is executed, a bit pattern of nozzle check patterns necessary for one scanning is rasterized on the printing buffer, and carriage scanning is started.

When the recording of one scanning is finished, paper feeding is carried out at a predetermined conveying rate. After an end of the paper feeding, a next bit pattern necessary for one scanning is rasterized on the printing buffer of one band, and carriage scanning and paper feeding are carried out as described above. Pattern rasterization, carriage scanning, and paper feeding of a bit pattern necessary for one scanning are repeated by a predetermined number of times in the printing buffer and, after recording of a last nozzle check pattern is finished, a sheet is discharged to finish the nozzle check pattern printing mode.

In a normal recording operation (recording mode), data is stored in the printing buffer based on received data sent from the host apparatus. Recording is carried out using the data stored in the printing buffer. On the other hand, in the nozzle check pattern printing operation (mode), recording data may be generated in the printing buffer using a pattern stored in a ROM based on a control code of the ROM disposed in the recording apparatus. Then, a recording operation is carried out using this recording data. Accordingly, the generation process of recording data is much different between the two modes.

In a case of nozzle check pattern printing in a printer incapable of securing a printing buffer of one band, recording is carried out by transmitting a nozzle check pattern from the host apparatus to the printer. Specifically, the nozzle check pattern is incorporated as a print file into a printer driver beforehand and, when printing of the nozzle check pattern is selected from a maintenance tab of the printer driver, the print file is transferred to the printer (JP A 2004-102445).

However, the above technology is based definitely on a premise that the printer driver is successfully installed in the host apparatus, and the host apparatus and the printer are connected to each other.

Because of such a premise, a user of the printer is required to set the host apparatus to be in a power-ON status to print the nozzle check pattern. Then, the user is required to check installation of the printer driver. This is inconvenient for the user, imposing time and labor burden on the user. If the user cannot correctly use the printer driver, even when the host apparatus is operating, the user may not be able to print the nozzle check pattern.

SUMMARY OF THE INVENTION

An embodiment of the present invention has been developed with the foregoing problems in mind, and is directed to providing a low-cost recording apparatus with high maintenance performance in which printing of a nozzle check pattern is performed in the recording apparatus that has no printing buffer of one scanning and is not connected to a host apparatus.

According to an aspect of the present invention, an embodiment is directed to a recording apparatus having a buffer to store recording data, associated with a recording area in a scanning direction of a recording head divided into a plurality of areas, in units of the divided areas. The recording apparatus includes a signal generation unit configured to output a signal according to a position of the recording head, a transfer data generation unit configured to generate transfer data transferred to the recording head based on the signal output from the signal generation unit, and a pattern data generation unit configured to generate predetermined pattern data. The transfer data generation unit includes a selection unit configured to select one of a first input section for receiving the recording data read from the buffer and a second input section for receiving the pattern data generated by the pattern data generation unit.

Further features of the present invention will become apparent from the following detailed description of exemplary embodiments with reference to the attached drawings. It is noted that the references to "an" or "one" embodiment of this disclosure are not necessarily directed to the same embodiment, and such references mean at least one.

BRIEF DESCRIPTION OF THE DRAWINGS

The accompanying drawings, which are incorporated in and constitute a part of the specification, illustrate exemplary embodiments.

FIGS. 10A to 10C are diagrams showing structures of received data according to an exemplary embodiment of the present invention.

DETAILED DESCRIPTION OF THE EMBODIMENTS

Figure 1:
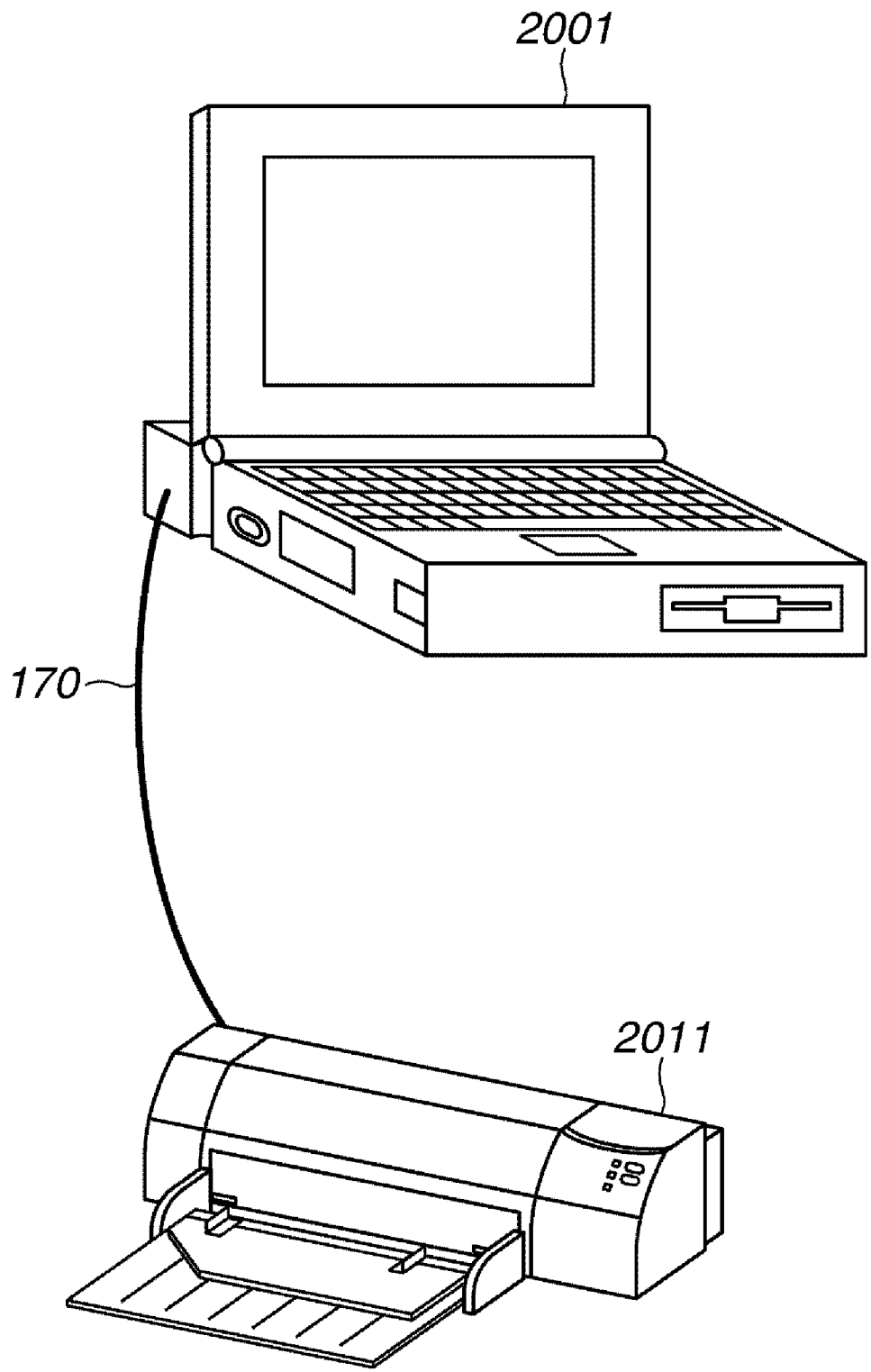
FIG. 1 is an external perspective view of a printing system according to an exemplary embodiment of the present invention.

The following description of exemplary embodiment (s) is/are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example, circuit patterns deposited on a substrate may be discussed, however these systems and the methods to fabricate these system as known by one of ordinary skill in the relevant art is intended to be part of the enabling disclosure herein where appropriate.

Note that similar reference numerals and letters refer to similar items in the following figures, and thus once an item is defined in one figure, it may not be discussed for following figures.

Exemplary embodiments will be described in detail below in accordance with the accompanying drawings.
<Entire Configuration of Printing System>

FIG. 1 is an external view of a printing system according to a first exemplary embodiment described below. This system includes a host computer 2001, and an ink jet printer (ink jet recording apparatus) 2011 connected to the host computer 2001 via a serial interface 170.

Figure 2:
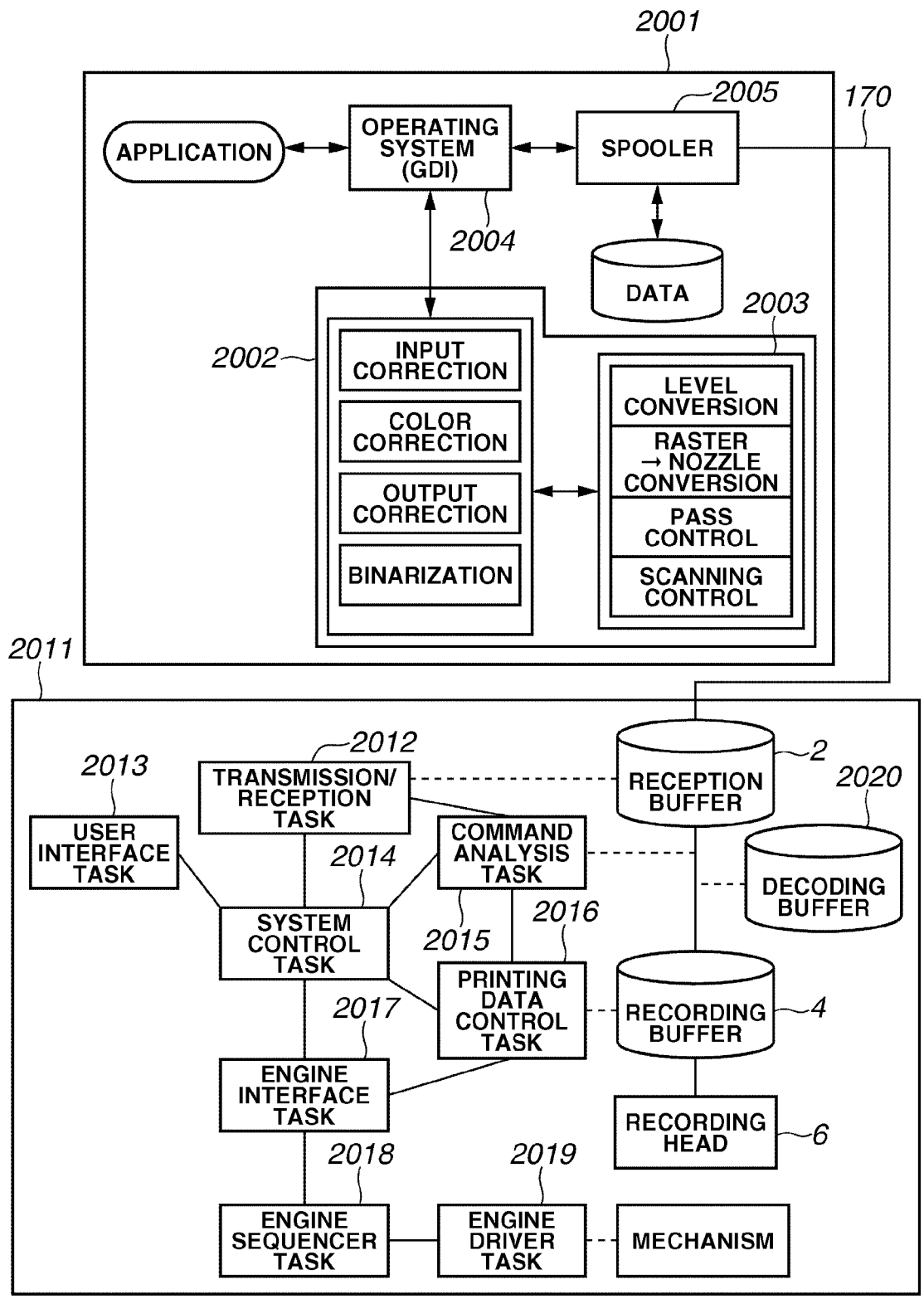
FIG. 2 is a functional block diagram of the printing system according to an exemplary embodiment of the present invention.

FIG. 2 is a functional block diagram of the printing system according to an exemplary embodiment. In the host computer 2001, a printer driver 2002 obtains an image created by an application, i.e., data in an RGB form as color information and in a raster form as a data array, via a graphics driver interface (GDI) 2004 of an operating system.

The printer driver 2002 repeats execution of a process (input correction, color correction, output correction, binarization or the like) which is non-dependent on model characteristics of the ink jet printer 2011, and execution of a process which is dependent on the model characteristics, by raster units. Thus, data is generated by the host computer 2001, which is transmitted to the ink jet printer 2011. Especially, the process dependent on the model characteristics is executed by an output module 2003 which is one of modules included in the printer driver 2002.

In the output module 2003, a conventional level conversion process is executed. In addition to the level conversion process, raster/nozzle conversion (HV conversion) is executed by the output module 2003 for converting data from a raster data form of YMCK to a form matched with a nozzle layout as described later. Moreover, printing pass control combining generation of recording data (printing data) and paper feeding control, and scanning control for detecting a printing left end/right end of each scanning are executed on the output module 2003 side. These conversion and control processes have been conventionally executed on the printer side.

Accordingly, it is possible to simplify a control circuit of the ink jet printer and software executed therein, which contributes to realization of a low-cost ink jet printer.

The printing data generated by the host computer 2001 is transmitted to the ink jet printer 2011 via a spooler block 2005 and the serial interface 170.

In the ink jet printer 2011, data reception of a reception buffer 2 is controlled by a transmission/reception task 2012. A command stored in the reception buffer 2 is analyzed by a command analysis task 2015 to execute control according to a command type. In the case of a mechanical operation related command such as a paper feeding command, an ejecting command, a paper sending command, a mechanical operation is realized by an engine interface task 2017 which is an interface between a mechanical control system and an upper layer, an engine sequencer task 2018 for controlling a mechanical sequence, and an engine driver task 2019 for controlling input/output of a mechanical unit such as a sensor or a motor.

When a command is determined to be a decoding command (described below) by the command analysis task 2015, direct memory access (DMA) transfer is executed from the reception buffer 2 to a decoding buffer 2020. When a command is determined to be a printing information command (printing left end/right end, block size, number of blocks, number of color planes, or the like) by the command analysis task 2015, the information is transmitted to a printing data control task 2016. When an analyzing result of the command analysis task 2015 is a printing data command, DMA (direct memory access) transfer of printing data from the reception buffer 2 to a recording buffer 4 is started by the command analysis task 2015. In the DMA transfer, printing data of one block (equal to 64 columns) is transferred. Together with the start of the transfer, in synchronization with DMA transfer end interruption, a scanning start is instructed from the printing data control task 2016 to the engine interface task 2017.

At the engine interface task 2017, various registers for printing within an application specific integrated circuit (ASIC, i.e., gate array) 174 (FIG. 4) are set. Then, a carriage is moved (scanning with recording head) to perform printing using the engine sequencer task 2018 and the engine driver task 2019. When the carriage reaches a predetermined encoder position, based on set values of the printing related registers, the ASIC 174 executes DMA transfer from the recording buffer 4 to the recording head 6 and drive control of the recording head 6 is performed. Inks are discharged from the recording head to form an image of one scanning amount on recording sheet (recording medium).

Other tasks include a user interface task 2013 that detects a user input such as a cover switch for detecting cover opening/closing, a power key or a resume key operated by a user. The illustrated printer 2011 further includes a system control task 2014 that adjusts an operation between the tasks.

<Configuration of Recording Apparatus>

Figure 3:
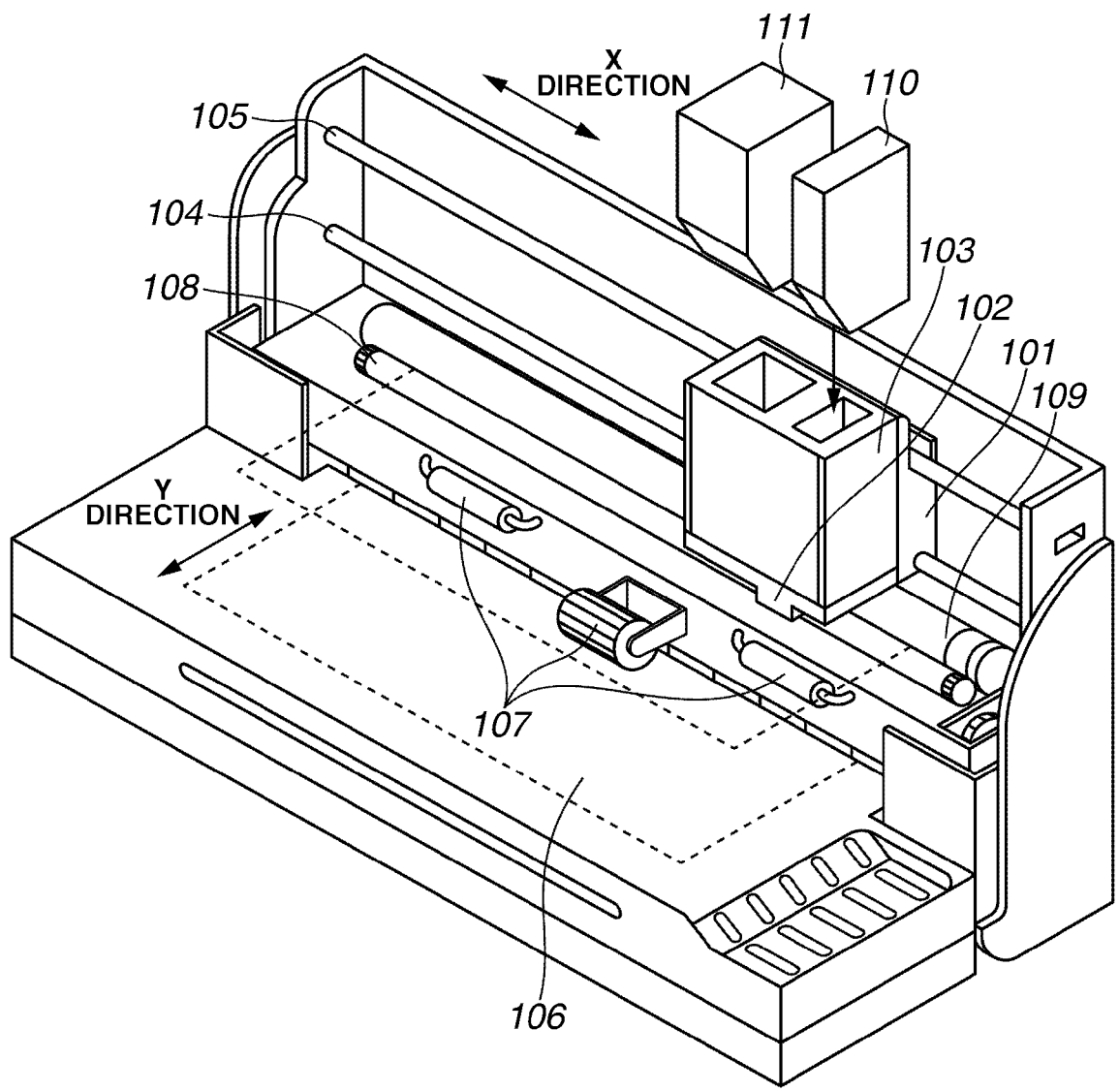
FIG. 3 is an external perspective view of an ink jet printer according to an exemplary embodiment of the present invention.

FIG. 3 is an external perspective view of a mechanical configuration of the ink jet printer 2011 according to an exemplary embodiment. The ink jet printer 2011 is configured to be capable of both color printing, and black and white mono-color printing. As shown in FIG. 3, a recording head 102 (6 in FIG. 2) of a multinozzle type having a number of nozzles (e.g., 320 nozzles for black and 192 nozzles for each color), and a cartridge guide 103 are mounted on a carriage 101. The recording head 102 discharges an ink of black (K), or inks of cyan (C), magenta (M), yellow (Y) and black (K). When a printer is in operation, an ink cartridge 110 containing a black ink, and an ink cartridge 111 containing three other inks are attached to the recording head 102.

The inks of cyan (C), magenta (M), yellow (Y) and black (K) are supplied from the ink cartridges 110 and 111 to the recording head 102. A driving signal is supplied to each nozzle of the recording head 102 via a flexible cable (not shown) that has many conducting wires arranged therein.

Figure 7A:
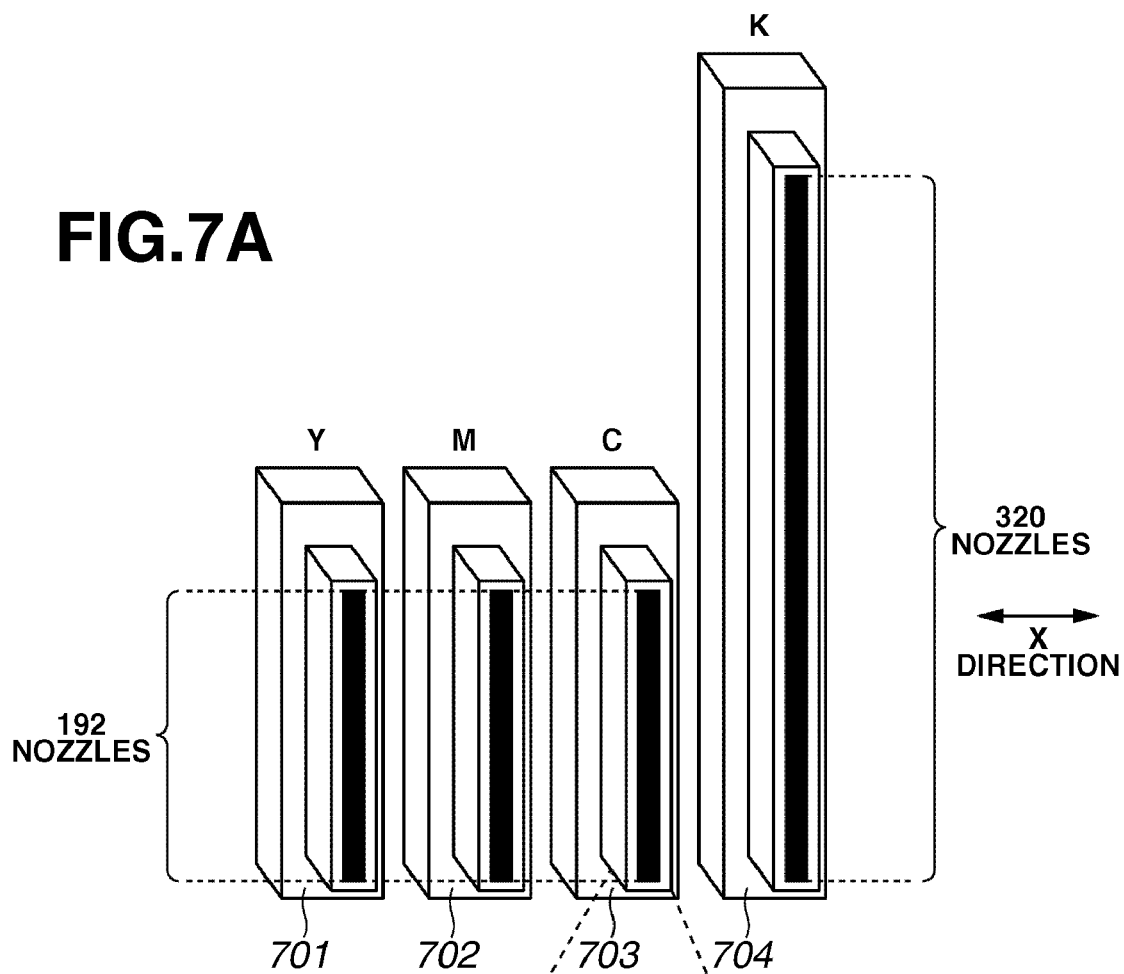
FIGS. 7A and 7B are external perspective views of a recording head according to an embodiment of the present invention.

FIG. 7A is an external perspective view of the recording head 102 for color printing seen from a recording medium 196 side, according to an exemplary embodiment. A row of nozzles (nozzle array) corresponding to the respective colors (yellow (Y) 701, magenta (M) 702, cyan (C) 703, and black (K) 704) are arranged in a direction roughly orthogonal to a scanning direction (X direction). As shown in a cyan nozzle layout of FIG. 7B, each color nozzle of yellow, magenta, and cyan has a structure in which small and large nozzle rows are each arranged in parallel by 192 nozzles. Accordingly, for colors, totally 1152 nozzles (192 nozzles×6 planes (yellow large/small, magenta large/small, and cyan large/small) are arranged, and the small and large nozzles are treated as different color planes for the purpose of control.

Referring back to FIG. 3, the carriage 101 is mounted on two guide rails 104 and 105, and an endless belt 109 connected to the carriage 101 is driven by a convey (line feed) motor (described below) to reciprocate the carriage 101 for scanning in an X direction (hereinafter referred to as "main scanning direction"). A convey (line feed) roller 108 is driven by a convey motor (line feed motor) (described below) to carry the recording medium 106 in a Y direction (hereinafter referred to as "subscanning direction").

Encoder slits (not shown) are arranged in parallel with the guide rails 104 and 105. A sensor (not shown) mounted on the carriage 101 reads the number of encoder slits to determine a position of the carriage 101 and/or the recording head 102 in a scanning direction, and a position of the carriage 101 is controlled by one pixel unit based on this positional information.

Figure 4:
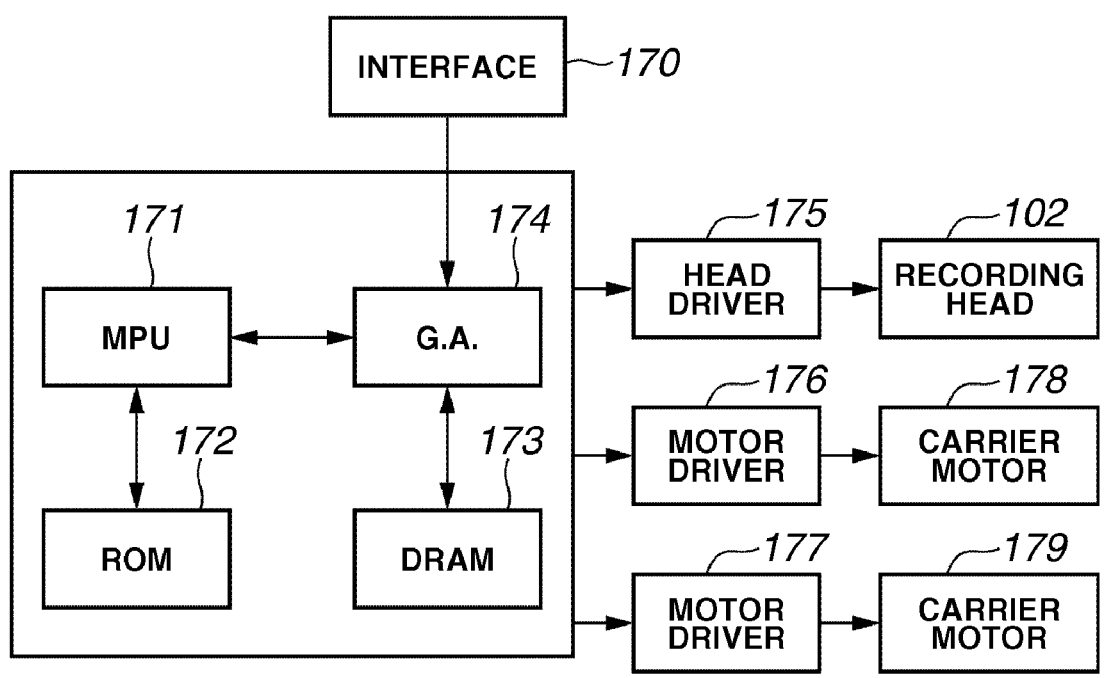
FIG. 4 is a block diagram showing a control circuit of the ink jet printer according to an exemplary embodiment of the present invention.

FIG. 4 is a block diagram showing a control circuit of the ink jet printer according to an embodiment of the present invention. In FIG. 4, reference numeral 170 denotes an interface for receiving a recording signal, e.g., recording data from an external apparatus such as the host computer 2001. Reference numeral 171 denotes an MPU, reference numeral 172 denotes a ROM for storing a control program (including character font when necessary) executable by the MPU 171, and reference numeral 173 denotes a DRAM for temporarily storing various data (the recording data, data supplied to the head, and the like)

An ASIC 174 (i.e., gate array) controls recording of the recording head 102, and also controls data transfer among the interface 170, the MPU 171 and the DRAM 173. Reference numeral 179 denotes a carrier motor for moving the recording head 102 in the main scanning direction, and reference numeral 178 denotes a convey (line feed) motor for carrying the recording medium in the subscanning direction. Reference numeral 175 denotes a head driver for driving the recording head 192, reference numerals and 176 and 177 denote motor drivers for driving the convey motor (line feed motor) 178 and the carrier motor 179 respectively.

An outline of an operation of the control circuit will be described. When the recording data is received through the interface 170, the data is converted into driving data by the ASIC 174 and the MPU 171. When the motor drivers 176 and 177 are driven, a recording element of the recording head 102 is driven based on the driving data and a control signal sent to the head driver 175 to discharge inks.

<Data Flow in Recording Apparatus>

Figure 5:
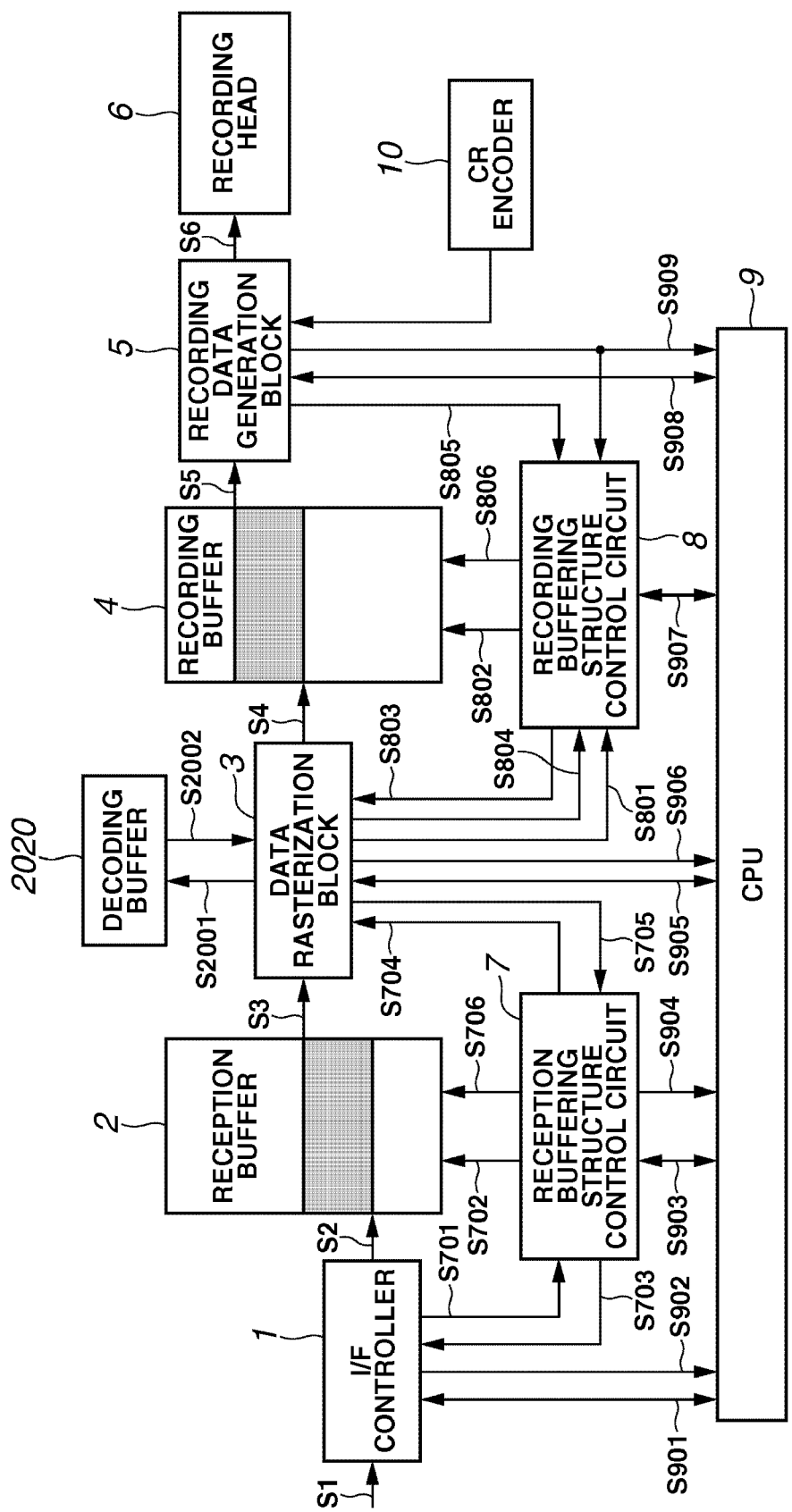
FIG. 5 is a block diagram showing a recording control unit according to an exemplary embodiment of the present invention.

FIG. 5 is a block diagram showing a recording control unit of the printer 2011 in the printing system according to an exemplary embodiment of the present invention. An interface control unit (I/F controller) 1 receives data transferred from the host computer 2001 via an interface signal line S1, and extracts image data and data necessary for a recording operation from the received data. The data extracted by the interface controller (I/F controller) 1 are stored in the reception buffer 2 via a signal line S2.the signal line S1 is the interface 170.the CPU 9 is MPU 171.

The reception buffer 2 is constructed of a memory unit such as an SRAM or a DRAM, and data stored in the reception buffer 2 have structures as shown in FIGS. 10A to 10C.

As shown in a data structure of the reception buffer 2 of FIG. 10A, data of "COMMAND" (1001), "DATA LENGTH" (1002), and "SETTING DATA" (1003) are stored from the left in order, and subsequently data of "COMMAND" (1004), "DATA LENGTH" (1005), and "SETTING DATA" (1006) are stored. This structure shows that data transferred in a time series fashion are stored in sequential addresses of the reception buffer 2. The setting data 1006 shown here is information indicating, e.g., execution of paper feeding, setting of a paper feeding amount, the number of recording heads to be used, or the like. Recording can be executed only after all bits of information defined by the setting data are obtained. Subsequently, image data (1009, and 1012) to be recorded are stored in the reception buffer 2.

The image data (1009 and 1012) are obtained by dividing a data amount required when the recording head executes recording on the recording medium in one scanning. That is, the data amount is divided into block units of smaller data amounts. The image data are divided into block units to be sequentially stored as first block data (1009), second block data (1012), . . .

FIG. 10B shows the data structure of the image data divided by the block units in detail according to an exemplary embodiment of the present invention. As shown in FIG. 10B, data of plural colors (1013 to 1015) are sequentially stored as compressed data. These color data are separated by "COLOR CHANGE CODES" (1016, 1017, and 1018).

For example, in the case where a printing mode is a mode applicable to plain paper, four colors of cyan, yellow, magenta, and black are used, and only large nozzles are employed for colors, compressed data of first to fourth colors are stored in one data block. Nozzles of this nozzle row (nozzle array) are arrayed in the carrying direction of the recording medium.

Besides, there is a printing mode (recording mode) which is one of the modes applicable to special paper and which forms an image by three dye colors of cyan, yellow and magenta without using a pigment color of black which is difficult to fix on the special paper. In this case, grainy effects can be reduced by using small nozzles in addition to the large nozzles. In other words, two rows of nozzles (large and small nozzles), one row having 192 vertical nozzles for each of three colors of cyan, yellow and magenta, are arrayed in the scanning direction. In other words, two rows of nozzles are disposed for each color. That is, compressed data of first to sixth colors constitute one block data. For example, the first and second colors correspond to data of cyan, the third and fourth colors to data of magenta, and the fifth and sixth colors to data of yellow.

FIG. 10C shows a data structure stored in the reception buffer regarding one scan-printing in the case of a printing mode to which mask compression described below is applied in the output module, according to an exemplary embodiment of the present invention. FIG. 10A shows the case of the data structure where no mask compressing is applied. A difference in FIG. 10C from FIG. 10A is that information regarding compressing is inserted between scanning information commands (1021 to 1023) indicating printing left and right end positions of the scanning, and printing image data commands (1030 to 1032) of the first block. The inserted information is decoding information commands (1024 to 1026) and decoding data commands (1027 to 1029). These two types of commands transmit information necessary for decoding the image data subjected to mask compression in the output module on the ink jet printer side.

The decoding information command designates a decoding pattern to be used for decoding each color in a printing image data command. According to the exemplary embodiment, the decoding data command is decoding data itself that supports four patterns at the maximum. The decoding data is data used during the mask compression executed in the output module. The data used for the mask compression are different between forward-direction printing (scanning from carriage reference position to non-reference position), and backward-direction printing (scanning from non-reference position to reference position). A detail of the data used for the mask compression will be described below in connection with the mask compression in the output module. Thus, in the output module, a decoding information command and a decoding data command are generated for each scanning.

Figure 6:
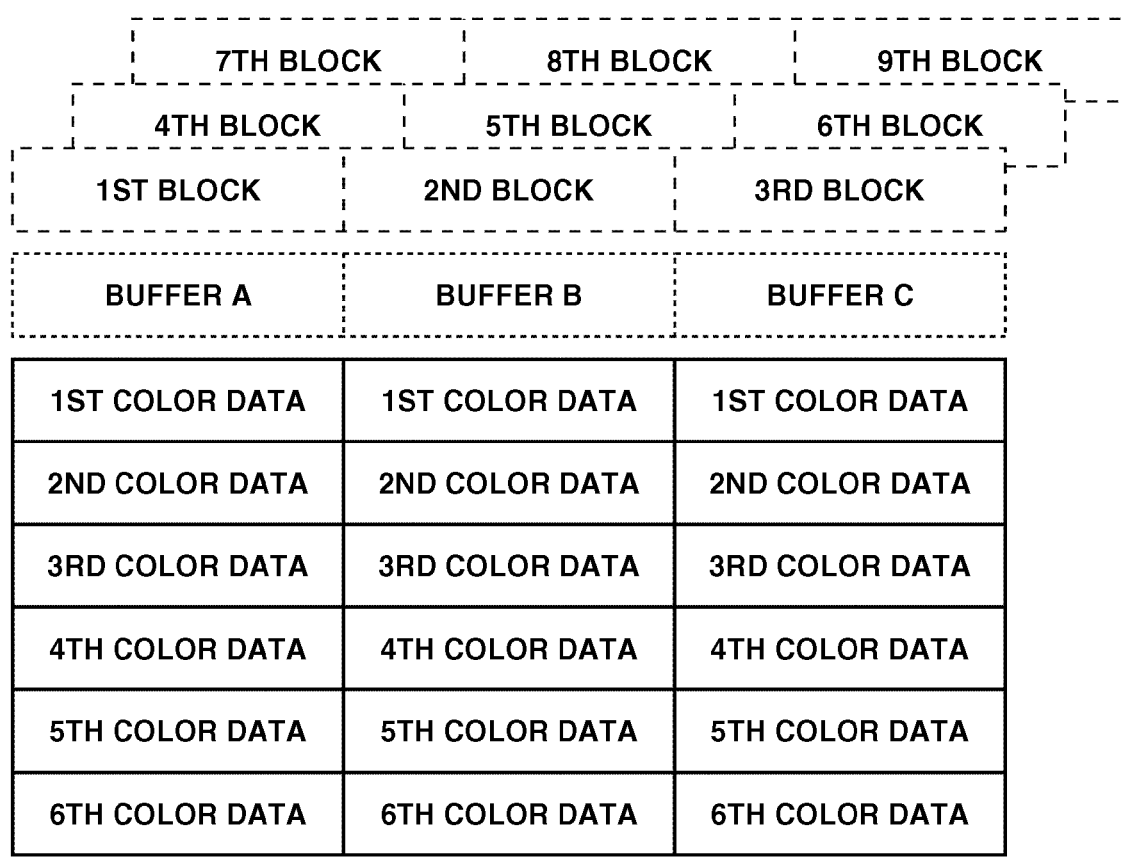
FIG. 6 is a diagram showing a data structure of a recording buffer according to an exemplary embodiment of the present invention.

FIG. 6 shows a data structure of the recording buffer 4 for holding image data according to an exemplary embodiment of the present invention. According to the exemplary embodiment, the number of columns is 64 (600 DPI) for one block, and the recording buffer 4 employs a ring buffer structure. For example, in the case of a mode applied to special paper and using both large and small nozzles of Y, M and C, first to sixth color data are stored in block data. A length of color data stored in each block corresponds to the number of nozzles of the recording head. To a size of the recording buffer 4, an amount equal to 3 blocks of maximum usable color planes is allocated, and the maximum usable number of color planes is 6 according to the exemplary embodiment. The number 6 indicates one of modes used in the case of special paper printing, where first to sixth color data are stored. Thus, as the size of the recording buffer 4, 27648 bytes (191 nozzles×64 columns×6 color planes÷8) are allocated in the DRAM 173.

For example, when a length of about 8 inches at the maximum is recorded in one scanning in the printing mode using the six color planes, the three blocks can be simultaneously held as above described. A buffer A is allocated to the first block, a buffer B is allocated to the second block, and a buffer C is allocated to the third block. When reading (printing) of the first block from the buffer A is finished, data of the fourth block is written in the buffer A. When reading of the second block from the buffer B is finished, data of the fifth block is written in the buffer B. After repeating such reading and writing (ring buffer process), data of the 75th block (8 inches× 600 DPI÷64 columns) is written in the buffer C at the end. Accordingly, the recording buffer 4 is configured to execute reading in parallel with writing by managing writing and reading pointers described below. With this configuration, one scan-printing can be carried out even when a capacity of the recording buffer 4 is far below a width of one scanning that is equal to 64 columns×3 blocks.

In the other case of using only one color, for example, data of 18 blocks can be simultaneously held. In this case, however, a printing buffer size is 1.92 inches in printing width, that is far below 8 inches of a maximum printing width.

Returning to FIG. 5, the description of each control block will be continued. Among the data stored in the reception buffer 2, "COMMAND", "DATA LENGTH", and "SETTING DATA" which are setting values for controlling the recording apparatus, are read from the I/F controller 1 via the signal line S902 by the CPU 9 and are set in the control circuits 7 and 8 (S903, and S907). The CPU 9 interprets the read data (corresponding to data 1001 to 1008 of FIG. 10A), and executes overall recording control of the printer 2011 according to its result. Regarding a process of the image data, the CPU 9 activates a data rasterization block 3 to execute the process.

The data rasterization block 3 has a decoding data downloading function, a decompression function (expansion function) for decompressing packbits, and a mask decompression function (mask expansion function) for decompressing the data after the decompression of the packbits based on the decoding data.

Thus, the data rasterization block 3 executes a double (two-stage) decompression process including the packbits decompression and the mask decompression. The decompression process of the packbits is called a packbits rasterization process, and the mask decompression is also called mask rasterization in other expressions.

The packbits rasterization will be described which is carried out in the data rasterization block while no mask compression is executed as shown in FIGS. 10A and 10B. As shown in FIG. 10B, the data rasterization block 3 reads three types of data, i.e., "COMPRESSED TAG", "DATA" and "COLOR CHANGE CODE", from the reception buffer 2, and executes data rasterization control based on these data. When the compressed TAG takes an 8-bit value of 00h to 7Fh, a process is carried out presuming that there are 1 to 128 non-sequential data in a data area. When the compressed TAG is an 8-bit data of FFh to 81h, a process of decompressing next 1-byte data from 2 data to 128 data which are sequential, is carried out. When a value of 80h is read at the compressed TAG, the data is processed as a color change code. The decompressed data is carried through the signal line S4 to be written in the recording buffer 4.

The decompressed image data is stored in the recording buffer 4 as shown in FIG. 6. Head data of the data corresponding to the first color of the first block is written (stored) at a head address (top address, initial address) of the recording buffer 4. Subsequent data are sequentially written while one address is added to each address. An area to be stored in the recording buffer 4 is decided based on setting data first read by the CPU 9, and data exceeding the value are inhibited to be written. Accordingly, when the image data is compressed, a limitation is imposed by a data size according to the setting data. Data after detection of a color change code are sequentially written from a head address (top address, initial address) of data corresponding to the second color. This address data is controlled by a recording buffering structure control circuit 8 described below.

This writing process is carried out from the first to eighth color data. When the writing of the eight color data is finished and a color change code is detected, all the data of the first block have been written. When the data rasterization block 3 finishes a data rasterization operation, the data rasterization block 3 notifies completion of data rasterization of one block to the CPU 9 through interruption (INT 1) and waits for a start of next data rasterization from the CPU 9.

When image data of a plurality of blocks are stored in the recording buffer 4, the CPU 9 operates the carrier motor 179 to start a recording operation. Scanning and recording are carried out with the recording head 6 to form an image on paper (recording medium). A movement of the recording head 6 is accompanied by output of a signal from an encoder (CR encoder) 10. After the recording head 6 performs scanning in the main scanning direction, the convey unit carries the recording medium in the subscanning direction. Thus, an image of one page is recorded by repeating scanning with the recording head and carrying the recording medium.

The recording data generation block 5 reads the recording data from the recording buffer 4 via the signal line S5 based on a value designated by the CPU 9 using a timing synchronized with the CR encoder 10, and outputs the data to the signal line S6 while converting them into data structures to be recorded by the recording head 6. The recording data generation block 5 holds information of a block width (block length) in the recording buffer described below, and information about a height ("number of rasters" of color data) of each color of the block.

Next, the decoding data downloading function applied to decoding data commands (1027 to 1029) of FIG. 10C will be described. The data rasterization block 3 reads the decoding data command (1027) and a data length (1028) from the reception buffer 2, carries decoding data fetched via the signal line S3 through the signal line S2001 without rasterizing or decompressing it, and transfers the data by DMA to the decoding buffer 2020 allocated to a part of the DRAM 173. According to the exemplary embodiment, decoding data of four patterns 0 to 3 are stored, and an area of 1536 bytes (192 vertical rasters×63 horizontal columns−8) per pattern is allocated.

Lastly, mask rasterization will be described, which is executed by the data rasterization block 3 when a decoding information command (1024) is detected between the scanning information command (1021) and the printing data command (1030) as shown in FIG. 10C. The CPU 9 establishes a decoding pattern number applied to data corresponding to each color based on a parameter (1026) of the decoding information command (1024) before packbits rasterization is started. CPU 9 sets validity of a mask rasterization function, decode pattern number to be applied to each color data, and offset information, in a mask rasterization register group (not shown) of the data rasterization block via the signal line S905. Each decoding pattern is 2-dimensional data of 192 rasters× 64 columns, and the offset information designates a position to start decoding.

Subsequently, as in the case of the packbits rasterization, the CPU 9 starts the packbits rasterization by the data rasterization block via the signal line S905. The data rasterization block 3 fetches the image data of the reception buffer via the signal line S3 to execute the packbits rasterization. Simultaneously, the data rasterization block 3 fetches decoding data corresponding to the image data from the decoding buffer 2020 via the signal line S2002, and restores data before mask compression, from both the data after the packbits rasterization and the decoding data. Then, the data rasterization block 3 stores the recording data in the recording buffer 4 via the signal line S4.

<Writing/Reading Control of Reception Buffer 2>

The interface controller 1 writes the data into the reception buffer 2, and the data rasterization block 3 reads only the image data. However, it is a reception buffering structure control circuit 7 that controls its writing and reading addresses. The reception buffering structure control circuit 7 manages head and last addresses of the reception buffer 2, and writing and reading addresses.

The reception buffering structure control circuit 7 increments by one address each time a writing request signal is received from the interface controller (S701), and outputs it as information of a writing address to the reception buffer 2 (signal line S702). The reception buffering structure control circuit 7 returns the writing address to the head address (top address, initial address) of the reception buffer 2 when the last address (end address) of the reception buffer is reached.

When the writing data reaches (coincides with) the reading address, the reception buffer 2 is filled with data preventing writing of next data. This is notified to the I/F controller 1 via the signal line S703.

Simultaneously, based on an interruption signal S904, the data writing inhibited state of the reception buffer 2 is notified to the CPU 9. A structure of the reception buffer 2 can be set by CPU 9 in the internal register using a bus of the signal line S903.

The reading address is output to the reception buffer 2 by incrementing one address via the signal line S706 when the CPU 9 directly reads the data from the reception buffer 2 via a data reading register of the reception buffering structure control circuit 7, or when the data rasterization block 3 makes a request via the data reading request signal line S705.

The reception buffering structure control circuit 7 returns the reading address to the head address (top address, initial address) of the reception buffer 2 when the reading address reaches the last address (end address). When the reading address reaches (coincides with) the writing address, a notification is forwarded to the data rasterization block 3 via the signal line S704 that reading next data from the reception buffer 2 is not possible because there is no data to be read. Simultaneously, a notification is forwarded to the CPU 9 via an interruption signal of the signal line S904 indicating that there is no data to be read from the reception buffer 2.

The process of the data writing/reading control in the reception buffer 2 has been above described. Next, process will be described in which the data read from the reception buffer 2 and subjected to rasterization in the recording buffer 4 is written to the recording buffer 4, or the data is read from the recording buffer 4.

<Writing/Reading Control of Recording Buffer 4>

The data rasterization block 3 writes the image data into the recording buffer 4, and the recording data generation block 5 reads the written image data from the recording buffer 4. During the execution of this process, recording buffering control circuit 8 controls writing and reading addresses of the image data stored in the recording buffer 4.

The recording buffering structure control circuit 8 manages head and last addresses of the recording buffer 4, and the writing and reading addresses.

The recording buffering structure control circuit 8 increments by one address each time a writing request signal is received from the data rasterization block 3 via the signal line S801, and outputs the signal as writing address information to the recording buffer 4 via the signal line S802. Then, when a last address (end address) of the recording buffer 4 is reached, the recording buffering structure control circuit 8 returns the writing address to the head address (top address, initial address) of the recording buffer 4.

Moreover, when the writing address reaches (coincides with) a reading address, the recording buffering structure control circuit 8 communicates to the data rasterization block 3 via the signal line S803 that next image data cannot be written because the recording buffer 4 is filled with image data.

Further, when a color change code is read from the reception buffer 2, the data rasterization block 3 communicates to the recording buffering structure control circuit 8 via the signal line S804. In response, the recording buffering structure control circuit 8 prepares to output a head address (top address, initial address) for storing next color data through the signal line S802. A structure of the recording buffer 4 can be set up in a manner that the CPU 9 writes data in the internal register using a bus of the signal line S907.

When the recording data generation block 5 sends the recording buffering structure control circuit 8 a data reading request via the signal line S805 for each color, one address is added as a reading address to the reading address via the signal line S806, and the reading address is output to the recording buffer 4.

When the reading address reaches the last address (end address), the recording buffering structure control circuit 8 returns the reading address to the head address (top address, initial address) of the recording buffer 4.

The recording data generation block 5 sets up a data structure of an image data block being read, in a register within the recording data generation block 5, via the signal line S908 from the CPU 9. Upon reading of all image data from the set image data block structure, an end signal S909 is transmitted as an interruption signal to the CPU 9.

At this stage, if a next image data block has been already rasterized in the recording buffer 4, its image data block structure is written in the register.

The recording buffer 4 controls data writing by image data block units, and the recording data generation block 5 is not activated for an unwritten image data block. Thus, the reading addresses of the recording buffer never exceed the writing addresses.

Now, supplements will be given about the reading of the recording data stored in the recording buffer 4 and the transfer to the recoding data generation block 5.

For example, in the case where recording is performed from the first to third nozzle rows, recording data corresponding to the first to third nozzle rows are read from the recording buffer 4 each by one column. First, after the recording data corresponding to the first nozzle row is read by one column and transferred, the recording data corresponding to the second nozzle row is read by one column and transferred.

Subsequently, the recording data corresponding to the first nozzle row is read again by next one column and transferred. Similarly, the data corresponding to the second and third nozzle rows are transferred each by next one column. Accordingly, until the number of columns of one block width is transferred, the recording data corresponding to the first to third nozzle rows are read each by one column and transferred to the recording data generation block 5. The outline of the data flow in the recording control unit has been described.

<Generation of Nozzle Check Pattern>

The data flow has been described in which the printing data transferred from the host PC 2001 via the serial interface 170 is stored in the reception buffer 2 of the ink jet printer 2011, and subjected to the data rasterization by the data rasterization block 3, and the data stored in the recording buffer 4 reaches the recording head 6 via the recording data generation block 5.

Figure 11:
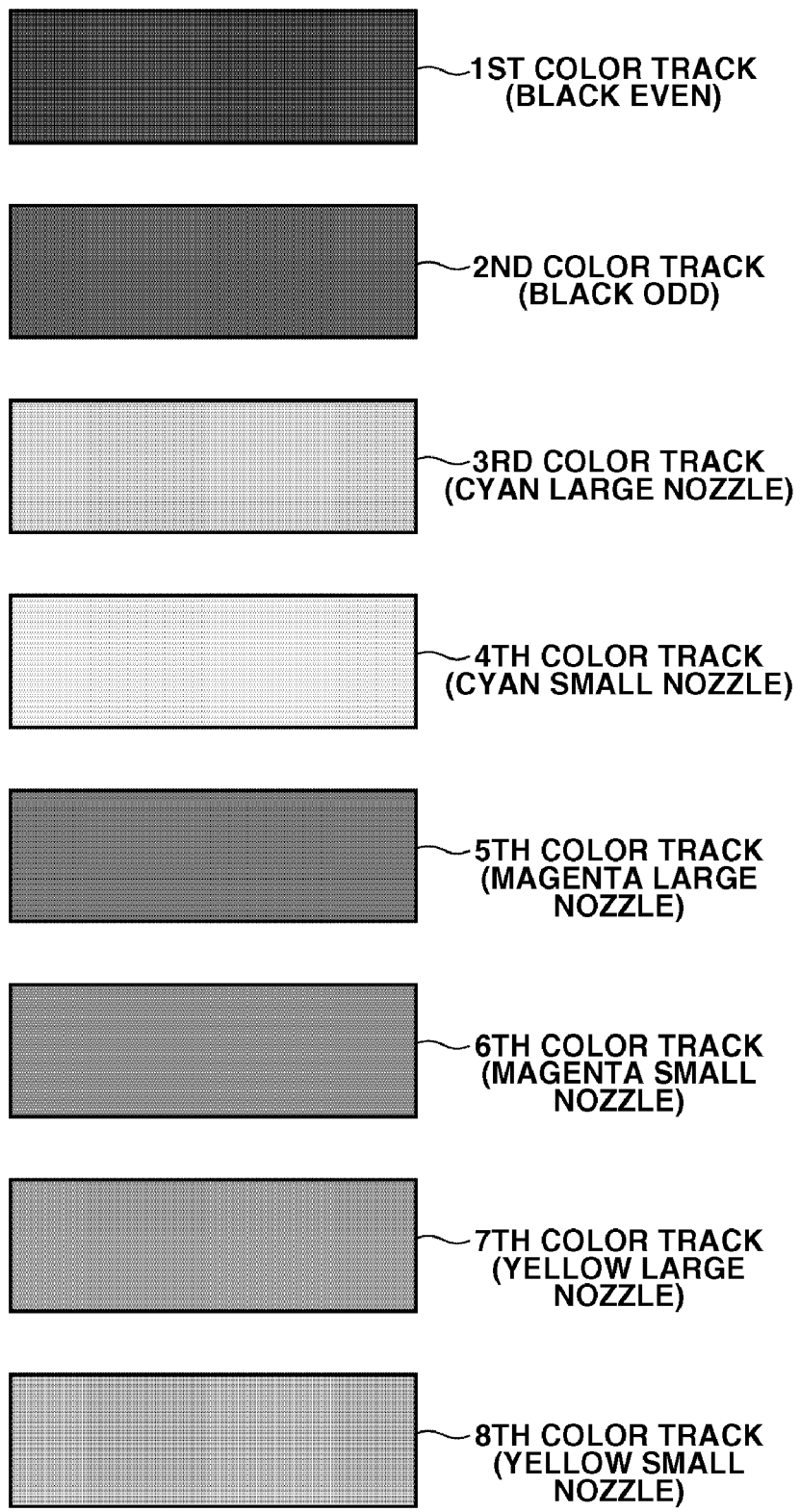
FIG. 11 is a diagram showing a printing result of the simple nozzle check pattern according to an exemplary embodiment of the present invention.

Next, second printing data generation method will be described by using the detailed description of the recording data generation block 5 (FIG. 8), the control flow of a simple nozzle check pattern printing (FIGS. 9A and 9B), and a result of the simple nozzle check pattern printing (FIG. 11).

Figure 8:
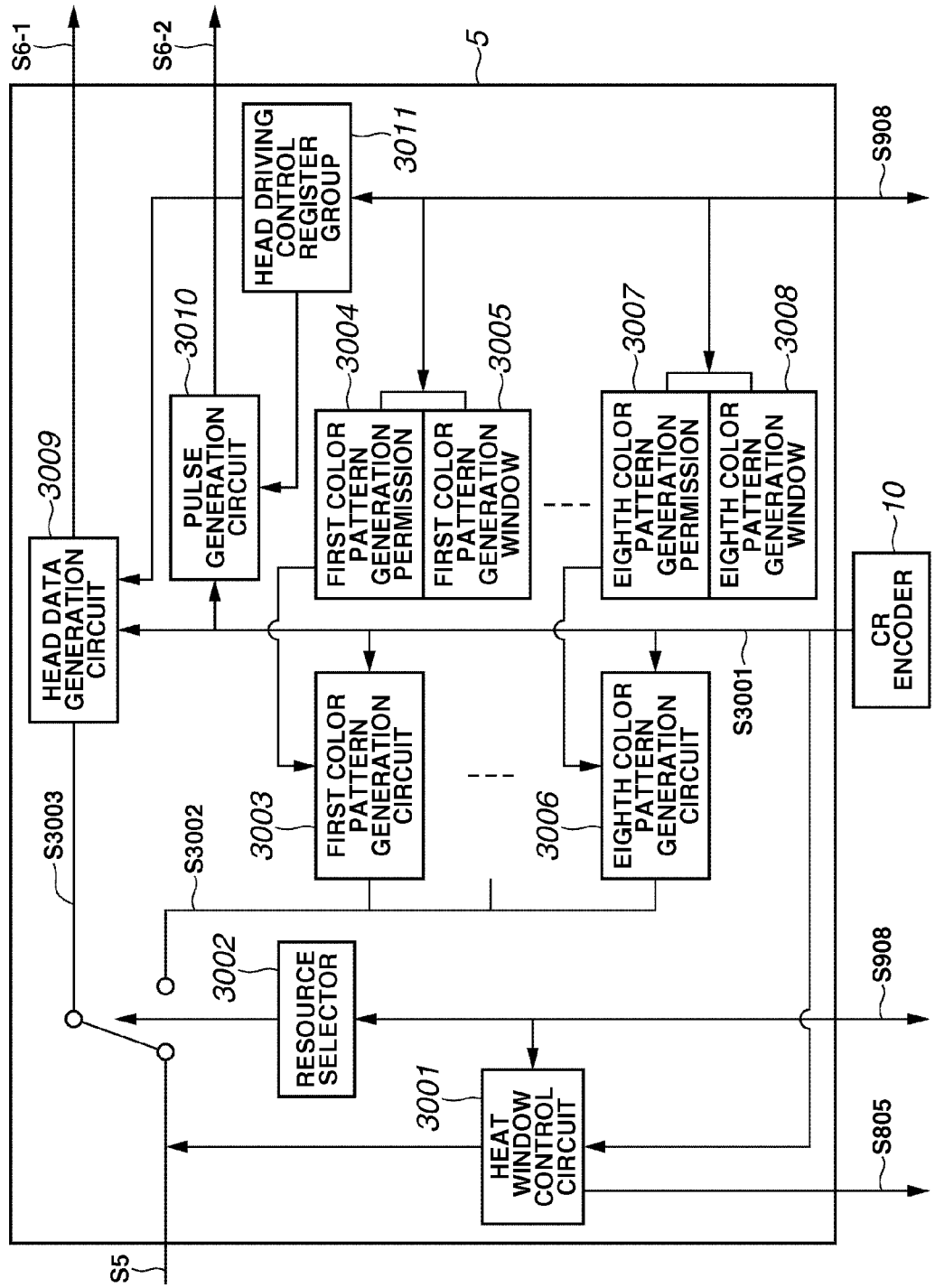
FIG. 8 is a diagram showing a recording data generation block in detail according to an exemplary embodiment of the present invention.

Referring to FIGS. 5 and 8, the recording data generation block 5 includes a head data generation function of generating data of a serial type, and a pulse signal generation function of generating a pulse signal for driving the recording head 6.

The recording data generation block 5 generates data of a serial type suitable for the recording head 6 in synchronization with an encoder signal (S3001) from the CR encoder 10. The recording data generation block 5 also generates a heat pulse to be supplied to the recording head 6 in synchronization with the encoder signal.

The former is generated by a head data generation circuit 3009, and the latter is generated by a pulse generation circuit 3010. The head data generation circuit 3009 and the recording head 6 are connected to each other through one serial data line. A clock signal line for transfer is also connected between the head data generation circuit 3009 and the recording head 6. Data are transferred via this serial data line. These data constitute a data signal group (S6-1). A plurality of heat pulse signal groups (S6-2) corresponding to the nozzle rows are connected between the pulse data generation circuit 3010 and the recording head 6.

As another form, a serial data line corresponding to the nozzle row of each color can be disposed. In this case, a transfer clock signal line can be disposed in each serial data line.

An input signal line (S3003) of the head data generation circuit 3009 has a form similar to a data transfer signal (S5) between the recording buffer 4 and the recording data generation block 5. Similarly, a signal line (S3002) has a form similar to the data transfer signal (S5). Data generated by pattern generation circuits (3003 and 3006) of eight color planes of first to eighth colors are transferred through the signal line (S3002). Thus, data of one column each are sequentially transferred from the pattern generation circuits to the head data generation circuit 3009. For example, when recording is executed for the first color by one scanning, pattern data corresponding to the first color is generated, and data of a one column unit is transferred.

The signal lines S5 and S3002 are switched by a resource selector 3002 that can be controlled by the CPU 9 via a control signal S908. In other words, based on a control signal from the CPU 9, the data input line to the head data generation circuit 3009 is switched. Selection is made whether data read from the recording buffer 4 (i.e., by connecting the signal line S5 to the signal line S3003) is input to the head data generation circuit 3009 or data generated by the pattern generation circuit disposed in the recording data generation block is input to the head data generation circuit 3009 (i.e., by connecting signal line S3002 to the signal line S3003).

The first to eighth colors are prepared for the pattern generation circuit. The first to eighth colors respectively correspond to a first row of black nozzles (160 nozzles at 300 DPI interval), a second row of black nozzles (160 nozzles at 300 DPI interval), a third row of large cyan nozzles (192 nozzles at 600 DPI), a fourth row of small cyan nozzles (192 nozzles at 600 DPI), a fifth row of large magenta nozzles (192 nozzles at 600 DPI), a sixth row of small magenta nozzles (192 nozzles at 600 DPI), a seventh row of large yellow nozzles (192 nozzles at 600 DPI), and an eighth row of small yellow nozzles (192 nozzles at 600 DPI).

Each pattern generation circuit receives an encoder signal S3001 from the CR encoder 5 and includes a pattern generation permission register to which execution/non-execution of pattern generation can be set from the CPU 9. Reference numeral 3004 denotes a first color pattern generation permission register, and pattern generation permission registers corresponding to the second to eighth colors are similarly provided.

Reference numeral 3005 denotes a first color pattern generation window register. The pattern generation window register 3005 generates a timing (period) of executing pattern generation by the pattern generation circuit based on a CR encoder signal. By this timing, a recording start position (start column position) and a recording end position (end column position) in the scanning direction are decided. By a timing compliant with a value set in the register 3005, a first color pattern is generated. Similarly, pattern generation window registers are provided for the second to eighth colors.

The pattern generation permission register and pattern generation window registers can be set for each color from the CPU 9 via the control signal line S908.

The inside of pattern generation circuit is not particularly described here. But, it can employ following configurations: a configuration where counters and comparators are provided corresponding to each number of nozzles to inexpensively generate all bits 1 (discharge), a configuration where 1 (discharge)/0 (non-discharge) can be set in each nozzle position, or a configuration where a plurality of patterns are prepared for nozzle positions, and the patterns are switched according to encoder signal information.

Figure 9A:
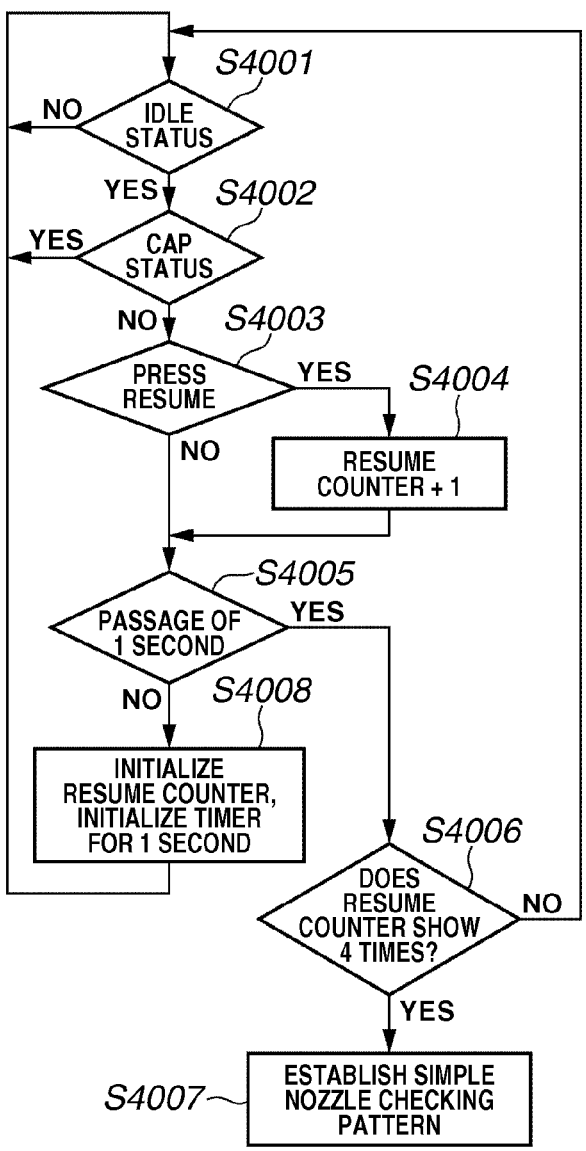
FIGS. 9A and 9B are flowcharts showing a control flow of printing a simple nozzle check pattern according to an exemplary embodiment of the present invention.
Figure 9B:
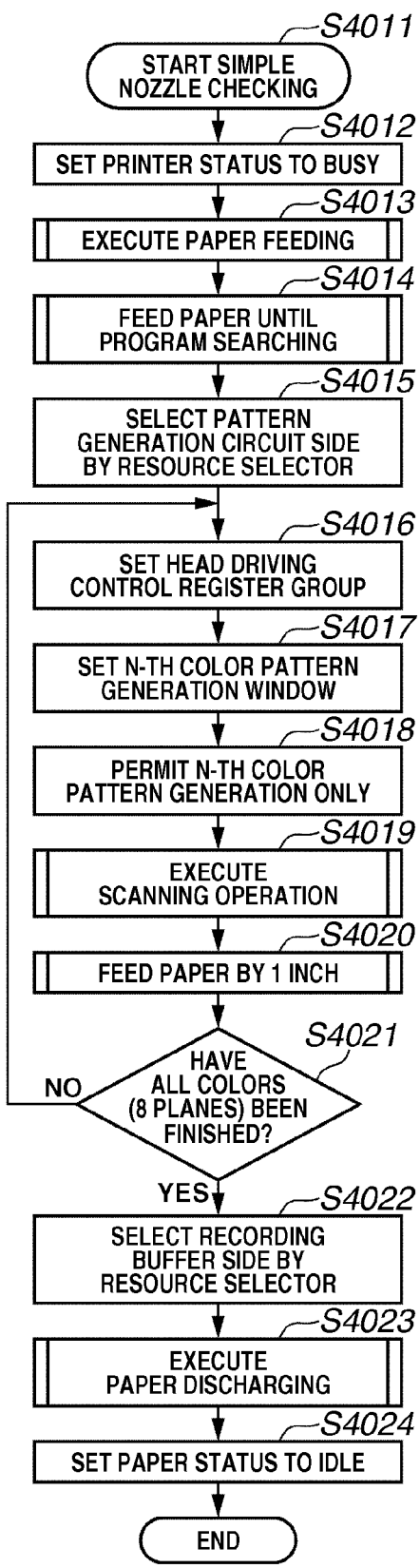

Referring to FIGS. 9A and 9B, a control flow of printing a simple nozzle check pattern according to an exemplary embodiment of the present invention will be described by using the above circuitry.

First, by executing an entry flow of FIG. 9A, the process is set to be in a mode of outputting the nozzle check pattern.

According to the process, when a user interface task 2013 of FIG. 2 is executed, and the printer 2011 is in an idle status (S4001) but not in a capping status (S4002), if the resume key is continuously pressed four times (S4003→S4004→S4005→S4006) within 1 second, a message of executing the simple nozzle check pattern is issued to a system control task 2014 (S4007). If the resume key is not pressed four times within 1 second, the resume counter and a 1-second timer are initialized (S4008) and a series of checking from the idle status are repeated.

When the execution message of the simple nozzle check pattern printing is received, the system control task 2014 transfers the message to a printing data control task 2016, and instructs a transmission/reception task 2012 to switch a printer status to "Busy" to inhibit transfer of printing data from the host PC 2001 (S4012). Accordingly, it is possible to prevent printing data transfer from the host PC 2001 during the simple nozzle check pattern printing.

The printing data control task 2016 that has received the execution message of the simple nozzle check pattern printing, carries out a paper feeding operation based on mechanical control by an engine sequencer task 2018 and an engine driver task 2019 via an engine interface task 2017 (S4013). Each of tasks executes a process of carrying the recording medium to an area of recording carried out by first scanning (S4014).

Next, the printing data control task 2016 controls the resource selector 3002 in the recording data generation block 5 based on the control signal S908, and switches input resources directed to the head data generation circuit 3009 from the data signal line S5 of the recording buffer 4 to the data signal line S3002 of the pattern generation circuit groups (3003 and 3006) (S4015).

As described above, during the normal printing (in the mode of receiving data from the host PC 2001 to record the data), the recording data generation block 5 generates a data reading request for each color through the signal line S805.

The signal line S805 is generated from the heat window control circuit 3001 in the recording data generation circuit 5 in synchronization with encoder information S3001 from the CR encoder 10 and according to a reading situation of the recording buffer 4 via the signal line S5.

In the case of executing printing of the simple nozzle check pattern (simple nozzle check pattern recording mode), the resource selector 3002 selects the pattern generation circuit disposed in the recording data generation block 5 as data resources. In this case, neither data writing in the recording buffer 4 nor data reading from the recording buffer 4 is carried out. Needless to say, control concerning a data reading request or the like from the data reading request signal line S805 to the recording buffering structure control circuit 8 is not carried out.

As described above, the signal lines S5 and S3002 are completely similar in data signal form, and data are generated in synchronization with the encoder information (S3001) from the CR encoder 10 in both cases. Thus, in head data generation by the head data generation circuit 3009, similar (common) setting can be performed for both normal printing and simple nozzle check pattern printing. With respect to setting of a heat pulse width, also setting common to both printings can be performed. Thus, the printing data control task 2016 sets the same setting data in the head driving control register group 3011 via the signal line S908 (S4016), as in the case where data is received from the host PC 2001 and printed.

Next, an encoder area for first color (first black row) is designated (S4017) to permit pattern generation of only a first color among the eight color planes (S4018). Accordingly, inks are discharged from the nozzles (nozzle row) corresponding to the first color based on data generated by the first color pattern generation circuit 3003, and a test pattern (nozzle checking pattern) can be recorded on the recording medium.

Figure 7B:
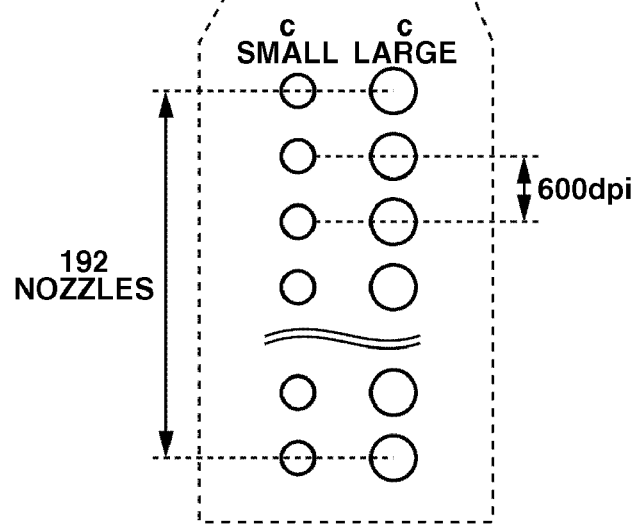

To supplement the above description, according to the exemplary embodiment, as shown by the recording head external perspective views of FIGS. 7A and 7B, the first black row, the second black row, the large cyan nozzle, the small cyan nozzle, the large magenta nozzle, the small magenta nozzle, the large yellow nozzle, and the small yellow nozzle are arranged in the main scanning direction in this order. The encoder area designation of the step S4017 is set considering a difference in a position of the heads in the main scanning direction. As indicated by the nozzle check pattern printing result of FIG. 11, it is set so that data can be printed in the same position in the main scanning direction.

Now, returning to the description of the control flow, the printing data control task 2016 instructs the engine sequencer task 2018 and the engine driver task 2019 to execute scanning (scanning operation) of the recording head via the engine interface task 2017 (S4019).

By this instruction, the scanning operation is started to execute printing (160 nozzles×3 inches at 300 DPI) of the first black row of FIG. 11.

The encoder information S3001 generated from the CR encoder 10 is updated according to a position of the recording head 6 (carriage). The pattern generation circuits (3003 and 3006) of the recording data generation block 5 makes comparison with the pattern generation window setting of the step S4017 using the encoder information. Pattern generation synchronized with the encoder signal is executed while the encoder information is in the window. Pattern generation is not executed when the encoder information is outside the window. Through the pattern generation window setting, a period of permitting pattern generation is set.

The generated data is transferred to the head data generation circuit 3009 via the signal line S3002. As a result, printing (160 nozzles×3 inches) of the first black row of FIG. 11 is carried out.

When the scanning operation is finished, paper feeding of 1 inch is carried out (S4020).

Next, the process returns to the step S4016, and the processes up to the step S4020 are performed to execute scanning (scanning operation) of only the second color with the recording head.

Thereafter, the processes of the steps S4016 to S4020 are carried out six times to execute recording of eight colors. Through this process, it is possible to obtain a printing result of the simple nozzle check pattern as shown in FIG. 11 (S4021).

Thus, even without receiving any data from the host PC 2001, it is possible to record test patterns of an amount of data that is larger than a capacity of the printing buffer (recording buffer 4).

The printing data control task 2016 selects the recording buffer 4 side using the resource selector 3002 to switch resources of the head data generation circuit 3009 from the pattern generation circuit to the recording buffer 4 side (S4022). The printing data control task 2016 executes paper discharging using the engine sequencer task 2018 and the engine driver task 2019 via the engine interface task 2017 (S4023) and returns a reply indicating the end of the simple nozzle check pattern printing process to the system control task 2014.

The system control task 2014 that has received the reply, transmits to the transmission/reception task 2012 an instruction to return the printer status set in the step S4012 from Busy to the idle status and completes the printing execution of the simple nozzle check pattern (S4024).

As described above, even without receiving any data from the host apparatus, it is possible to record the test pattern of an amount of the data that is larger than the capacity of the recording buffer.

While the above test pattern is employed to check the ink discharging status of the recording head, test pattern for other purposes can be employed. For example, a registration adjustment pattern for adjusting a recording position between the nozzle rows, or a convey pattern for checking a variance in a convey amount by the convey unit can be also employed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-199965 filed Jul. 8, 2005, which is hereby incorporated by reference herein in its entirety.

What is claimed is:

1. A recording apparatus which performs recording on a recording medium by scanning a recording head in a predetermined direction, wherein the recording head includes a first row of nozzles for a first color and a second row of nozzles for a second color, the recording apparatus comprising:
   a recording buffer which stores recording data;
   a control unit configured to control the recording apparatus;
   a signal generation unit configured to output a signal according to scanning of the recording head; and
   a transfer data generation unit including:
      a first timing generation unit configured to generate a timing of executing pattern generation for the first color;
      a second timing generation unit configured to generate a timing of executing pattern generation for the second color;
      a first pattern generation unit configured to generate pattern data for the first color based on the timing generated by the first timing generation unit and the signal from the signal generation unit;
      a second pattern generation unit configured to generate pattern data for the second color based on the timing generated by the second timing generation unit and the signal from the signal generation unit;
      a head data generation unit configured to generate transfer data to be transferred to the recording head; and
      a selection unit configured to control selecting between a first state in which the head data generation unit is connected to the recording buffer and a second state in which the head data generation unit is connected to the first pattern generation unit and the second pattern generation unit, based on a control signal from the control unit.

2. The recording apparatus according to claim 1, wherein the signal generation unit is an encoder unit.

3. The recording apparatus according to claim 1, wherein the transfer data is serial type data.

4. The recording apparatus according to claim 1, further comprising an input unit configured to receive the recording data in units of divided recording areas from an external source.

5. The recording apparatus according to claim 1, wherein the first timing generation unit and the second timing generation unit respectively generate a timing of start position and a timing of end position in the predetermined direction.

* * * * *